(12) United States Patent
Oh et al.

(10) Patent No.: US 10,656,956 B2
(45) Date of Patent: May 19, 2020

(54) VIRTUAL DESKTOP SERVER FOR SUPPORTING HIGH-QUALITY GRAPHICS PROCESSING AND METHOD FOR PROCESSING HIGH-QUALITY GRAPHICS USING THE SAME

(71) Applicant: ELECTRONICS AND TELECOMMUNICATIONS RESEARCH INSTITUTE, Daejeon (KR)

(72) Inventors: Soo-Cheol Oh, Daejeon (KR); Dae-Won Kim, Daejeon (KR); Sun-Wook Kim, Hwaseong (KR); Jae-Geun Cha, Daejeon (KR); Ji-Hyeok Choi, Daejeon (KR); Seong-Woon Kim, Gyeryong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 57 days.

(21) Appl. No.: 15/924,041

(22) Filed: Mar. 16, 2018

(65) Prior Publication Data

US 2018/0293090 A1    Oct. 11, 2018

(30) Foreign Application Priority Data

Apr. 11, 2017  (KR) .................. 10-2017-0046622

(51) Int. Cl.
*G06T 1/20*        (2006.01)
*G06F 9/451*       (2018.01)
(Continued)

(52) U.S. Cl.
CPC .............. *G06F 9/452* (2018.02); *G06F 3/147* (2013.01); *G06F 3/1454* (2013.01);
(Continued)

(58) Field of Classification Search
CPC ......... G06F 9/452; G06F 3/147; H04N 19/46; G06T 1/20; G06T 1/60
(Continued)

(56) References Cited

U.S. PATENT DOCUMENTS 7,401,114 B1    7/2008  Block et al.
8,073,990 B1 *  12/2011 Baron ..................... G06F 13/28
                                        710/22
(Continued)

FOREIGN PATENT DOCUMENTS

| KR | 100742436 B1 | 7/2007 |
| KR | 101495069 B1 | 2/2015 |
| KR | 101609371 B1 | 4/2016 |

*Primary Examiner* — Jin Ge

(57) ABSTRACT

Disclosed herein are a virtual desktop server for supporting high-quality graphics processing and a method for processing high-quality graphics using the virtual desktop server. The virtual desktop server includes one or more virtual desktops for creating instructions for accelerated graphics processing by running a high-quality graphics application, one or more hardware-based graphics accelerators for creating screen data by executing the instructions for accelerated graphics processing and for storing the created screen data in a frame buffer, and a hypervisor for transmitting the screen data received from the virtual desktop to a client over a network, and the virtual desktop captures the screen data stored in the frame buffer, converts the captured screen data, and delivers the converted screen data to the hypervisor.

16 Claims, 7 Drawing Sheets

(51) Int. Cl.
  *G06F 3/147* (2006.01)
  *H04N 19/46* (2014.01)
  *G06F 9/455* (2018.01)
  *G06T 1/60* (2006.01)
  *G09G 5/36* (2006.01)
  *G06F 3/14* (2006.01)

(52) U.S. Cl.
  CPC ...... *G06F 9/45533* (2013.01); *G06F 9/45558* (2013.01); *G06T 1/20* (2013.01); *G06T 1/60* (2013.01); *G09G 5/363* (2013.01); *H04N 19/46* (2014.11); *G06F 2009/45579* (2013.01); *G06F 2009/45595* (2013.01); *G09G 2340/02* (2013.01); *G09G 2370/022* (2013.01)

(58) Field of Classification Search
  USPC .......................................................... 345/520
  See application file for complete search history.

(56) References Cited

U.S. PATENT DOCUMENTS

| | | |
|---|---|---|
| 8,200,796 B1 | 6/2012 | Margulis |
| 9,460,481 B2 | 10/2016 | Fonseca |
| 10,102,605 B1* | 10/2018 | Ingegneri ................ G06T 1/20 |
| 2006/0146057 A1* | 7/2006 | Blythe ................ G06F 9/45537 |
| | | 345/506 |
| 2009/0305790 A1* | 12/2009 | Lu ........................ G06T 15/005 |
| | | 463/42 |
| 2012/0166585 A1* | 6/2012 | Kim ........................ H04L 67/08 |
| | | 709/217 |
| 2013/0155083 A1* | 6/2013 | McKenzie ................ G06T 1/20 |
| | | 345/522 |
| 2014/0115036 A1* | 4/2014 | Lai ........................ H04L 67/08 |
| | | 709/203 |
| 2014/0354667 A1* | 12/2014 | Lin ..................... G06F 12/1027 |
| | | 345/568 |
| 2015/0042664 A1* | 2/2015 | Currid ..................... G06T 1/20 |
| | | 345/502 |
| 2016/0019079 A1* | 1/2016 | Chawla ............... G06F 9/45558 |
| | | 710/308 |
| 2016/0247248 A1* | 8/2016 | Ha ........................ G06F 9/455 |
| 2016/0364160 A1* | 12/2016 | Oh ..................... G06F 9/45558 |
| 2016/0378534 A1 | 12/2016 | Oh et al. |
| 2018/0293701 A1* | 10/2018 | Appu ....................... G06T 1/60 |

* cited by examiner

VIRTUAL DESKTOP SERVER FOR SUPPORTING HIGH-QUALITY GRAPHICS PROCESSING AND METHOD FOR PROCESSING HIGH-QUALITY GRAPHICS USING THE SAME

CROSS REFERENCE TO RELATED APPLICATION

This application claims the benefit of Korean Patent Application No. 10-2017-0046622, filed Apr. 11, 2017, which is hereby incorporated by reference in its entirety into this application.

BACKGROUND OF THE INVENTION

1. Technical Field

The present invention relates generally to a virtual desktop server for supporting high-quality 3D graphics processing, and more particularly to technology for supporting high-quality 3D graphics processing using a graphics accelerator based on hardware.

2. Description of the Related Art

Virtual desktop technology is technology in which multiple virtual machines are run on a single physical server by applying virtualization technology thereto for use of the virtual machines by one or more clients connected thereto over a network. A hypervisor creates logical resources from the physical resources of a server and provides the logical resources to a virtual desktop. Here, as representative examples of such physical resources, there are a Central Processing Unit (CPU), memory, a graphics device, and the like. A virtual desktop is run on the logical resources and is delivered to a client through a virtual desktop transfer module.

A virtual desktop system according to a conventional art provides only a virtual 2D graphics device based on software virtualization. The virtual 2D graphics device is configured such that a hypervisor supports software emulation, and may not be capable of processing 3D graphics, which requires a high computational load, or high-quality 4K graphics.

Accordingly, it is necessary to develop a virtual desktop system for supporting high-quality 3D graphics processing based on hardware.

[Documents Of Related Art]

(Patent Document 1) Korean Patent No. 10-0742436, published on Jul. 25, 2007 and titled "Method and apparatus for providing virtual desktop architecture".

SUMMARY OF THE INVENTION

An object of the present invention is to provide a virtual desktop system for supporting high-quality 3D graphics processing.

Another object of the present invention is to enable tasks, such as the execution of a 3D CAD program, the playback of high-quality video, and the like, to be performed on a virtual desktop.

In order to accomplish the above objects, a virtual desktop server for supporting high-quality graphics processing according to the present invention includes one or more virtual desktops for creating an instruction for accelerated graphics processing by running a high-quality graphics application; one or more hardware-based graphics accelerators for creating screen data by executing the instruction for accelerated graphics processing and for storing the created screen data in a frame buffer; and a hypervisor for transmitting the screen data received from the virtual desktop to a client over a network, wherein the virtual desktop captures the screen data stored in the frame buffer, converts the captured screen data, and delivers the converted screen data to the hypervisor.

Here, the virtual desktop may include a graphics application execution unit for creating the instruction for accelerated graphics processing; a display for rendering, for capturing the screen data stored in the frame buffer; a screen data agent for converting the captured screen data; and a display for transfer, for delivering the converted screen data to the hypervisor.

Here, the screen data agent may convert the screen data of the display for rendering into a data format corresponding to the display for transfer, and may copy the converted screen data onto the display for transfer.

Here, the screen data agent may repeatedly perform capture, conversion, and copy of the screen data stored in the frame buffer.

Here, the hypervisor may compress the screen data, received from the display for transfer, and may transmit the compressed screen data to the client.

Here, the hypervisor may compress the successive screen data, received from the display for transfer, using a video compression algorithm.

Here, the hypervisor may directly allocate the hardware-based graphics accelerator to the virtual desktop during initial setup.

Here, the hypervisor may directly allocate the hardware-based graphics accelerator to the virtual desktop using PCI passthrough.

Here, the hypervisor may include a hardware virtualization module for virtualizing hardware resources and providing the virtualized hardware resources to the one or more virtual desktops; a direct allocation module for directly allocating the hardware-based graphics accelerator to the virtual desktop; and a virtual desktop transfer module for transmitting the screen data to the client.

Here, the high-quality graphics application may include at least one of a 3D CAD program, a high-quality video playback program, and a graphics acceleration application.

Also, a method for processing high-quality graphics, performed by a virtual desktop server for supporting high-quality graphics processing, according to an embodiment of the present invention includes creating, by a virtual desktop, an instruction for accelerated graphics processing by running a high-quality graphics application; storing, by a hardware-based graphics accelerator, screen data, created by executing the instruction for accelerated graphics processing, in a frame buffer; capturing and converting, by the virtual desktop, the screen data stored in the frame buffer; and transmitting, by a hypervisor, the converted screen data to a client over a network.

Here, capturing and converting the screen data may include capturing the screen data stored in the frame buffer; converting the captured screen data; and delivering the converted screen data to the hypervisor.

Here, converting the captured screen data may include converting the screen data corresponding to a display for rendering into a data format corresponding to a display for transfer; and copying the converted screen data onto the display for transfer.

Here, the virtual desktop may repeatedly perform capture, conversion, and copy of the screen data stored in the frame buffer.

Here, transmitting the converted screen data to the client may be configured such that the hypervisor compresses the screen data and transmits the compressed screen data to the client.

Here, transmitting the converted screen data to the client may be configured to compress the successive screen data using a video compression algorithm.

Here, the method may further include directly allocating the hardware-based graphics accelerator to the virtual desktop during initial setup.

Here, directly allocating the hardware-based graphics accelerator may be configured to directly allocate the hardware-based graphics accelerator to the virtual desktop using PCI passthrough.

Here, the method may further include virtualizing a hardware resource including at least one of a central processing unit and main memory and providing the virtualized hardware resource to the one or more virtual desktops.

Here, the high-quality graphics application may include at least one of a 3D CAD program, a high-quality video playback program, and a graphics acceleration application.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
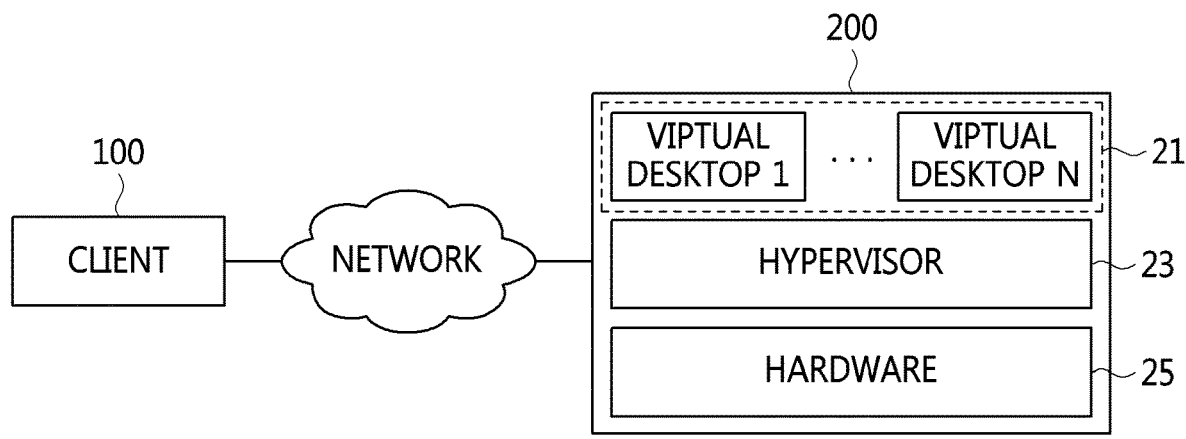
FIG. 1 is a view that schematically shows an environment in which a virtual desktop server for supporting high-quality graphics processing is applied according to an embodiment of the present invention.

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that schematically shows an environment in which a virtual desktop server for supporting high-quality graphics processing according to an embodiment of the present invention is applied.

As illustrated in FIG. 1, one or more clients 100 are connected with a virtual desktop server 200 for supporting high-quality graphics processing over a network.

As shown in FIG. 1, the virtual desktop server 200 for supporting high-quality graphics processing may include one or more virtual desktops 21, a hypervisor 23, and hardware 25. Also, the virtualization module of the hypervisor 23 may virtualize the resources of the hardware 25, and may provide the virtualized resources to the virtual desktops 21.

The virtual desktop server 200 for supporting high-quality graphics processing may include a high-quality graphics accelerator based on the hardware 25. The virtual desktop 21 may create data to be displayed on its screen using the 3D graphics accelerator directly allocated thereto, and the virtual desktop transfer module of the hypervisor 23 may transmit the created data to the client 100.

Hereinafter, the configuration of a virtual desktop server for supporting high-quality graphics processing according to an embodiment of the present invention will be described in detail with reference to FIG. 2.

Figure 2:
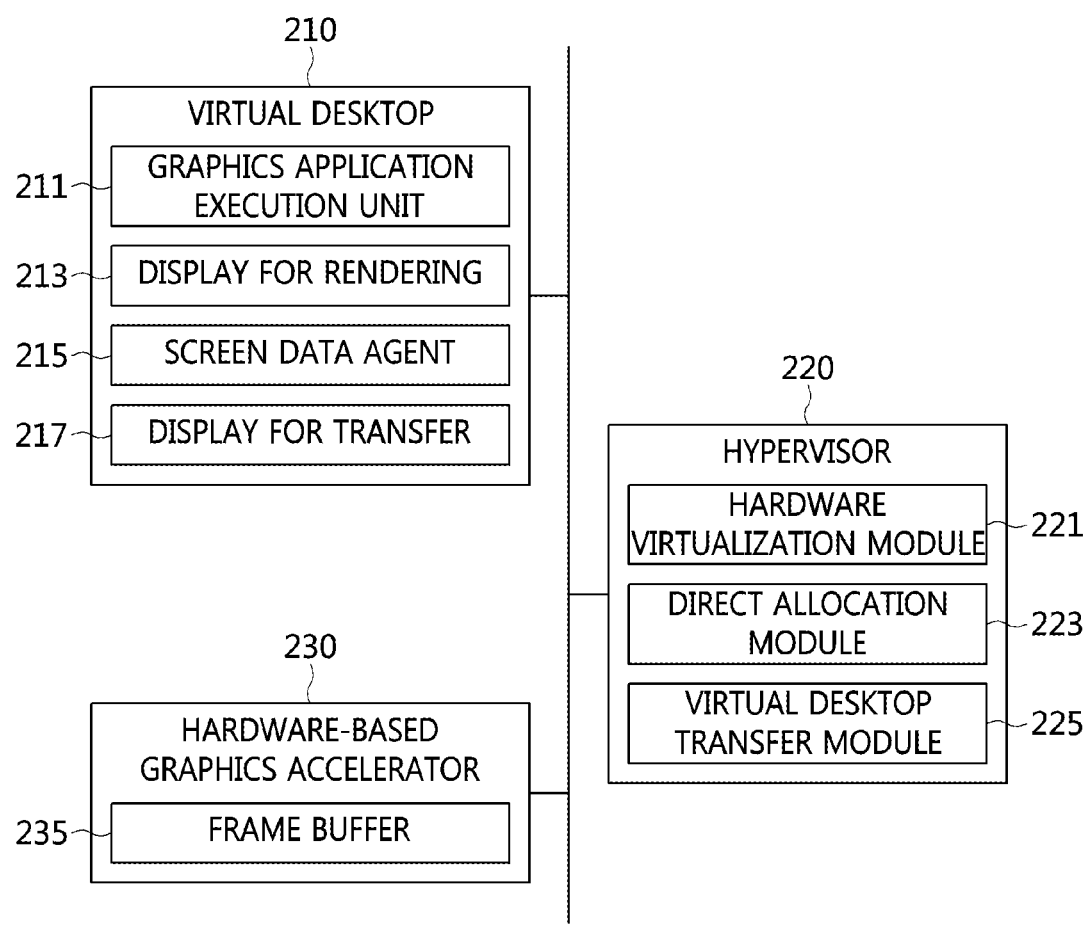
FIG. 2 is a block diagram that shows the configuration of a virtual desktop server for supporting high-quality graphics processing according to an embodiment of the present invention.

FIG. 2 is a block diagram that shows the configuration of a virtual desktop server for supporting high-quality graphics processing according to an embodiment of the present invention.

As shown in FIG. 2, the virtual desktop server 200 for supporting high-quality graphics processing includes a virtual desktop 210, a hypervisor 220, and a hardware-based graphics accelerator 230.

The virtual desktop 210 may include a graphics application execution unit 211, a display for rendering 213, a screen data agent 215, and a display for transfer 217.

The hypervisor 220 may include a hardware virtualization module 221, a direct allocation module 223, and a virtual desktop transfer module 225. Also, the hardware-based graphics accelerator 230 may include a frame buffer 235.

First, the graphics application execution unit 211 of the virtual desktop 210 runs a high-quality 3D graphics application and creates an instruction for accelerated graphics processing. Then, the hardware-based graphics accelerator 230 creates screen data by executing the instruction for accelerated graphics processing and stores the created screen data in the frame buffer 235.

The screen data agent 215 of the virtual desktop 210 captures the screen data, stored in the frame buffer 235 of the hardware-based graphics accelerator 230, using the display for rendering 213.

Also, the screen data agent 215 converts the captured screen data into a data format corresponding to the display for transfer 217 and copies the converted screen data onto the display for transfer 217. Also, the display for transfer 217 delivers the copied screen data to the virtual desktop transfer module 225 of the hypervisor 220.

The virtual desktop transfer module 225 of the hypervisor 220 transmits the screen data, received from the display for transfer 217, to a client over a network. Also, the virtual desktop transfer module 225 may compress successive screen data and transmit the compressed screen data to the client. Here, the virtual desktop transfer module 225 may compress the screen data using a video compression algorithm, such as motion JPEG, MPEG, H.264, or the like, but the kind of video compression algorithm is not limited to these examples.

Meanwhile, the hardware virtualization module 221 of the hypervisor 220 virtualizes the hardware resources of the virtual desktop server 200 for supporting high-quality graphics processing and provides the virtualized hardware resources to the virtual desktop 210. Here, the hardware resources may include a Central Processing Unit (CPU), main memory, and the like.

Also, the direct allocation module 223 of the hypervisor 220 directly allocates the hardware-based graphics accelerator 230 to the virtual desktop 210. Here, the direct allocation module 223 may directly allocate the hardware-based graphics accelerator 230 to the virtual desktop 210 using PCI passthrough, whereby the hardware-based graphics accelerator 230, installed in a PCI expansion slot of the virtual desktop server 200, may be directly allocated to the virtual desktop 210. The allocated hardware-based graphics accelerator 230 may be displayed as a 3D graphics accelerator inside the virtual desktop 210.

The hypervisor 220 directly allocates the hardware-based graphics accelerator 230 to the virtual desktop 210 only during initial setup. After the direct allocation, the virtual desktop 210 may control the hardware-based graphics accelerator 230 without the intervention of the hypervisor 220.

Hereinafter, a method for processing high-quality graphics, which is performed by a virtual desktop server for supporting high-quality graphics processing according to an embodiment of the present invention (hereinafter, simply referred to as 'virtual desktop server'), will be described in detail with reference to FIG. 2 and FIG. 3.

Figure 3:
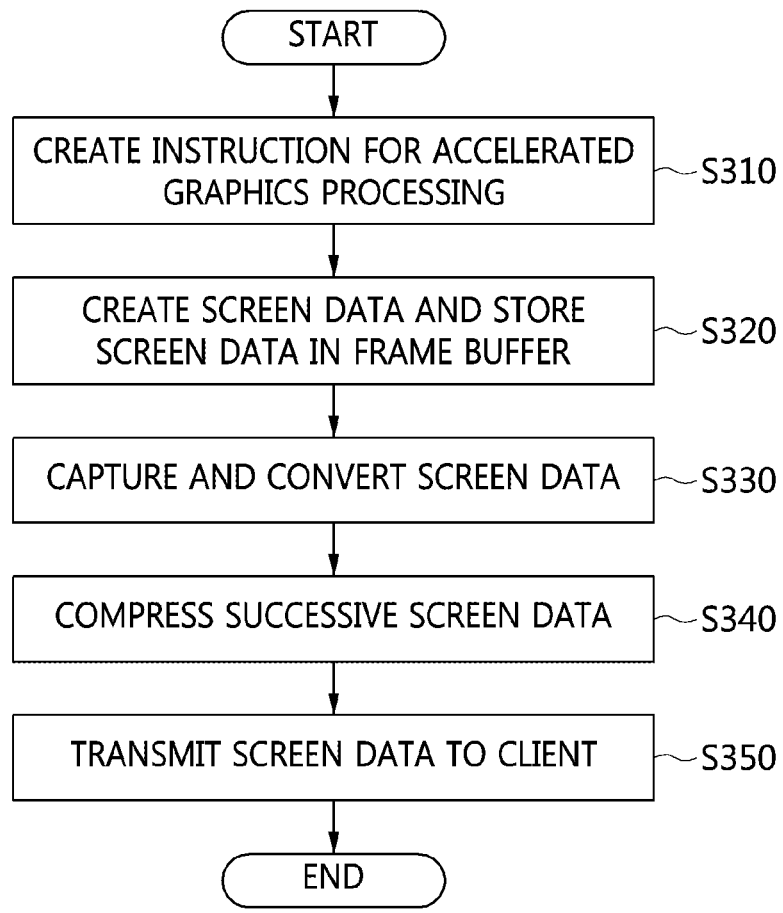
FIG. 3 is a flowchart for explaining a method for processing high-quality graphics according to an embodiment of the present invention.

FIG. 3 is a flowchart for explaining a method for processing high-quality graphics processing according to an embodiment of the present invention.

First, the virtual desktop server 200 creates an instruction for accelerated graphics processing at step S310.

The virtual desktop server 200 creates an instruction for accelerated graphics processing by running a high-quality 3D graphics application. Here, the high-quality 3D graphics application is a program that uses a 3D graphics accelerator directly allocated to the virtual desktop, and may be a 3D CAD program, a 4K video playback program, a graphics acceleration application, or the like.

A virtual desktop server (virtual desktop system) according to the conventional art provides only a virtual 2D graphics device based on software virtualization. The virtual 2D graphics device is configured such that a hypervisor provides software emulation, and it is difficult to process 3D graphics, which requires a high computational load, or high-quality 4K graphics. However, the virtual desktop server 200 according to an embodiment of the present invention may enable tasks, such as the execution of a 3D CAD program, the playback of high-quality video, and the like, to be performed on the virtual desktop.

Also, the virtual desktop server 200 creates screen data and stores the same in the frame buffer at step S320.

The instruction for accelerated graphics processing, which is created at step S310, is delivered to the hardware-based graphics accelerator via the display for rendering. Then, the hardware-based graphics accelerator of the virtual desktop server 200 creates screen data by executing the received instruction for accelerated graphics processing, and then stores the created screen data in the frame buffer.

Subsequently, the virtual desktop server 200 captures and converts the screen data at step S330.

The virtual desktop of the virtual desktop server 200 captures the screen data stored in the frame buffer and converts the captured screen data into a format of the display for transfer. Then, the virtual desktop copies the converted screen data onto the display for rendering.

Figure 4:
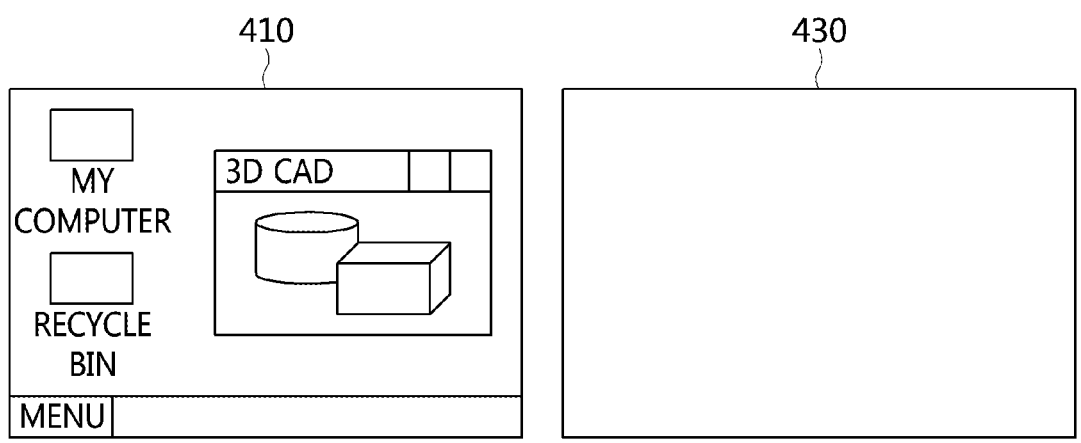
FIG. 4 is an exemplary view that shows the screens of a display for rendering and a display for transfer before screen data are copied at step S330 of FIG. 3.
Figure 5:
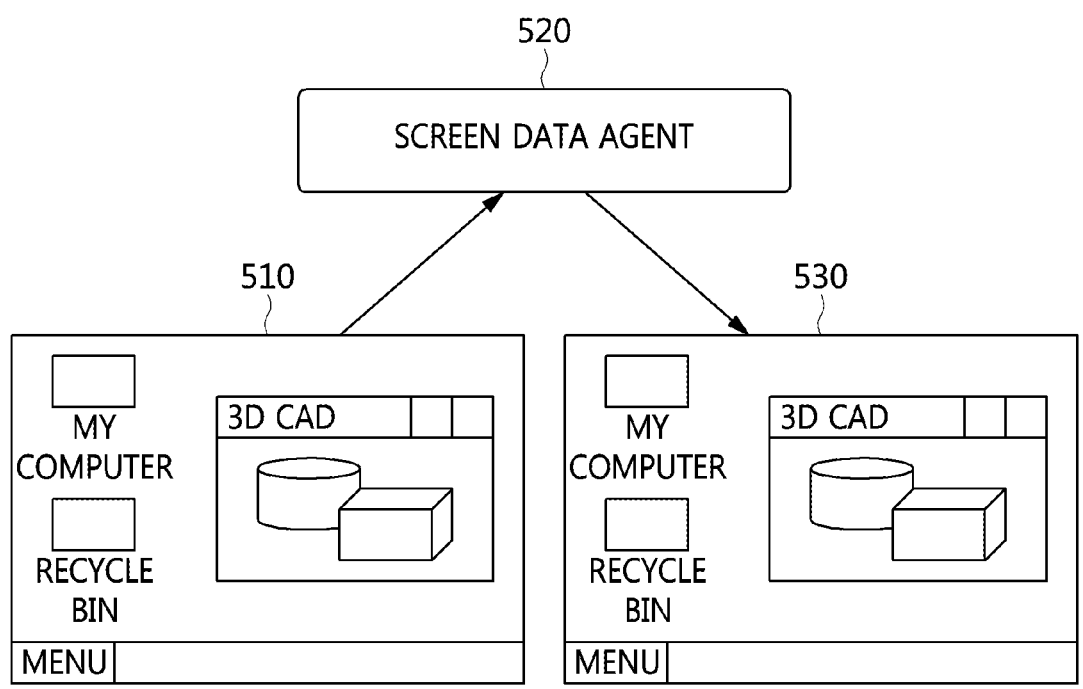
FIG. 5 is an exemplary view that shows the screens of a display for rendering and a display for transfer after screen data are copied at step S330 of FIG. 3.

FIG. 4 is an exemplary view that shows the screens of a display for rendering and a display for transfer before the screen data are copied at step S330, and FIG. 5 is an exemplary view that shows the screens of the display for rendering and the display for transfer after the screen data are copied at step S330.

As shown in FIG. 4, when the screen data stored in the frame buffer are captured, the screen of a display for rendering 410 includes high-quality 3D screen data. Meanwhile, the screen of a display for transfer 430 is empty.

However, when the screen data agent 520 of the virtual desktop converts the captured screen data and copies the converted screen data onto the screen of the display for transfer 530, the high-quality 3D screen data included in the screen of the display for rendering 510 are copied onto the screen of the display for transfer 530, whereby the screen of the display for rendering 510 and the screen of the display for transfer 530 include the same high-quality screen data.

Referring again to FIG. 3, the virtual desktop server 200 compresses successive screen data at step S340.

The virtual desktop transfer module of the virtual desktop server 200 may successively receive screen data from the display for transfer. The successive screen data may be in the form of general video, and the virtual desktop transfer module may compress the successive screen data using a video compression algorithm.

Here, the virtual desktop server 200 may use a video compression algorithm, such as motion JPEG, MPEG, H.264, or the like, in order to compress the screen data, but the kind of video compression algorithm is not limited to these examples.

Finally, the virtual desktop server 200 transmits the screen data to the client at step S350.

The virtual desktop transfer module of the virtual desktop server 200 transmits the compressed screen data to the client over a network. As described above, the virtual desktop server 200 enables the client to use a 3D CAD program, a high-quality video playback program, and the like using the virtual desktop server 200.

Hereinafter, an example of a virtual desktop server for supporting high-quality graphics processing according to another embodiment of the present invention will be described in detail with reference to FIG. 6.

Figure 6:
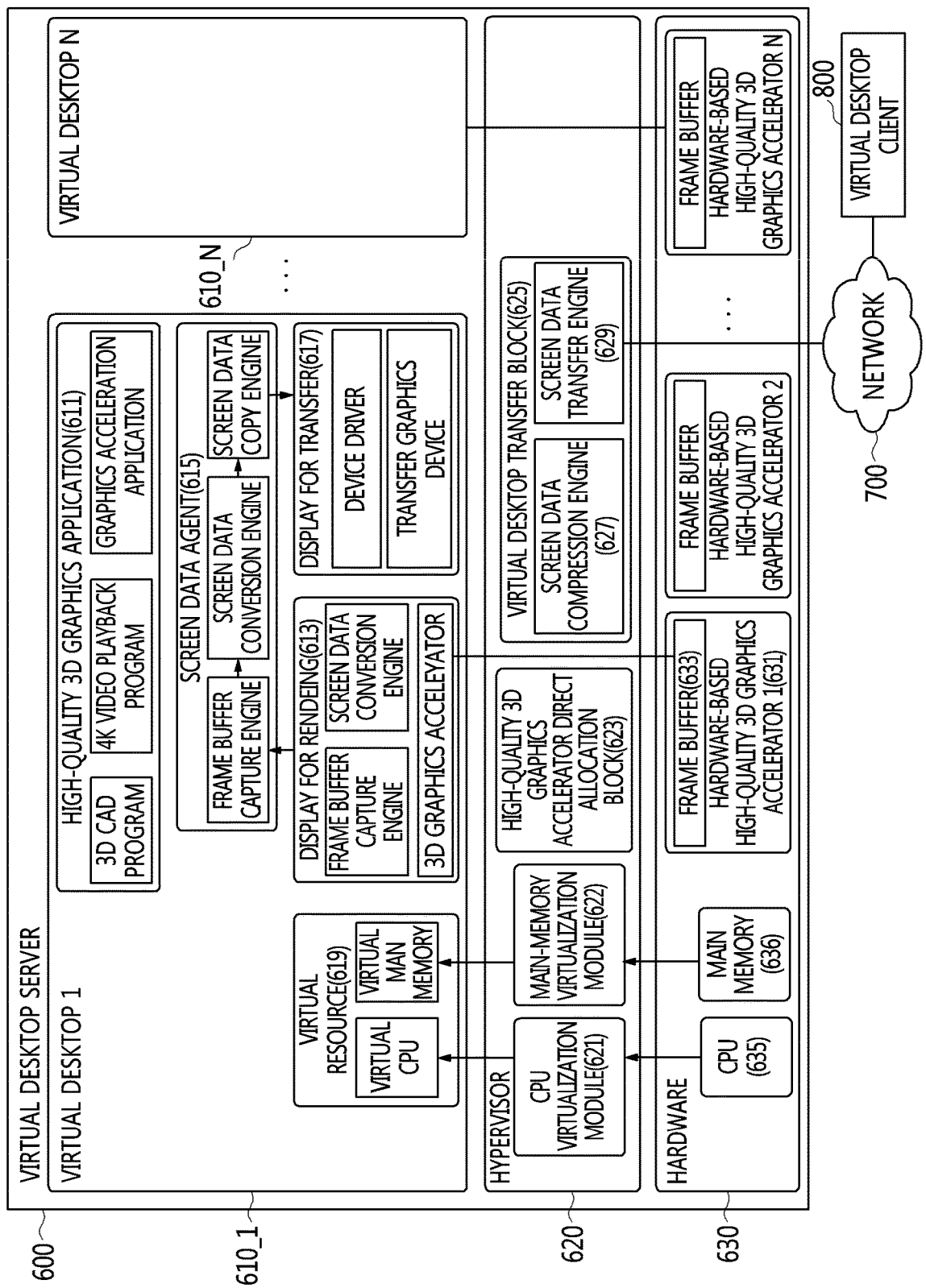
FIG. 6 is an exemplary view that shows the configuration of a virtual desktop server for supporting high-quality graphics processing according to another embodiment of the present invention.

FIG. 6 is an exemplary view that shows the configuration of a virtual desktop server for supporting high-quality graphics processing according to another embodiment of the present invention.

As illustrated in FIG. 6, the configuration of a virtual desktop server 600 may be broadly divided into a virtual desktop 610, a hypervisor 620, and hardware 630.

First, the virtual desktop 610 includes a high-quality 3D graphics application 611, a display for rendering 613, a screen data agent 615, a display for transfer 617, and a virtual resource 619.

The high-quality 3D graphics application 611 may include at least one of a 3D CAD program, a high-quality video playback program, and a graphics acceleration application, and creates an instruction for accelerated graphics processing.

The display for rendering 613 is for performing high-quality 3D graphics work using a 3D graphics accelerator, which is directly allocated to the virtual desktop 610. Also, the display for rendering 613 may be connected with a hardware-based high-quality 3D graphics accelerator 631 via a device driver and a 3D graphics accelerator.

The instruction for accelerated graphics processing, which is created in the high-quality 3D graphics application 611, may be delivered to the hardware-based high-quality 3D graphics accelerator 631 through the device driver and 3D graphics accelerator of the display for rendering 613.

Also, the capture driver of the display for rendering 613 represents a driver that is used to capture screen data stored in the frame buffer of the hardware-based high-quality 3D graphics accelerator 631.

The screen data agent 615 converts the screen data of the display for rendering 613 into the screen data of the display for transfer 617, and includes a frame buffer capture engine, a screen data conversion engine, and a screen data copy engine.

The frame buffer capture engine captures data of the frame buffer within the hardware-based high-quality 3D graphics accelerator 631 in real time using the capture driver of the display for rendering 613. Also, the screen data conversion engine converts the captured screen data into a data format corresponding to the display for transfer 617 in order to transmit the captured screen data thereto.

The screen data copy engine copies the converted screen data onto the display for transfer 617. The screen data in the frame buffer, which are captured every moment, are converted into screen data of a single image and copied onto the display for transfer 617. Also, the screen data agent 615 may repeatedly perform capture, conversion and copy of the screen data, for example, 24, 30, or 60 times per second.

Also, the display for transfer 617 is used to transmit the screen data, created by the display for rendering 613, to a virtual desktop transfer block 625 in the hypervisor 620 and delivers the converted screen data, received from the screen data agent 615, to the virtual desktop transfer block 625.

Next, the hypervisor 620 may include a CPU virtualization module 621, a main-memory virtualization module 622, a high-quality 3D graphics accelerator direct allocation module 623, a virtual desktop transfer block 625, a screen data compression engine 627, and a screen data transfer engine 629.

The CPU virtualization module 621 and the main-memory virtualization module 622 respectively virtualize a Central Processing Unit (CPU) 635 and main memory 636, which are resources of the hardware 630, and provides the resources as the virtual resources 619 of the virtual desktop 610.

The high-quality 3D graphics accelerator direct allocation module 623 directly allocates the hardware-based high-quality 3D graphics accelerator 631 to the virtual desktop 610 during initial setup. Here, the high-quality 3D graphics accelerator direct allocation module 623 may directly allocate the hardware-based high-quality 3D graphics accelerator 631 to the virtual desktop 610 using PCI passthrough.

The virtual desktop transfer block 625 transmits the screen data, received from the display for transfer 617 in the virtual desktop 610, to a virtual desktop client 800. Also, the virtual desktop transfer block 625 may include the screen data compression engine 627 and the screen data transfer engine 629.

The screen data compression engine 627 compresses successive screen data using a video compression algorithm, and the screen data transfer engine 629 transmits the compressed screen data to the virtual desktop client 800 over a network.

Finally, the hardware 630 includes physical resources, such as one or more hardware-based high-quality 3D graphics accelerators 631, a Central Processing Unit 635, main memory 636, and the like.

The hardware-based high-quality 3D graphics accelerator 631 includes a frame buffer 633. The hardware-based high-quality 3D graphics accelerator 631 creates screen data by receiving an instruction for accelerated graphics processing from the virtual desktop 610 and stores the created screen data in the frame buffer 633.

Here, the screen data stored in the frame buffer 633 are captured by the display for rendering 613 in the virtual desktop 610, and the captured screen data represent a single image file corresponding to raw data that are not compressed.

Figure 7:
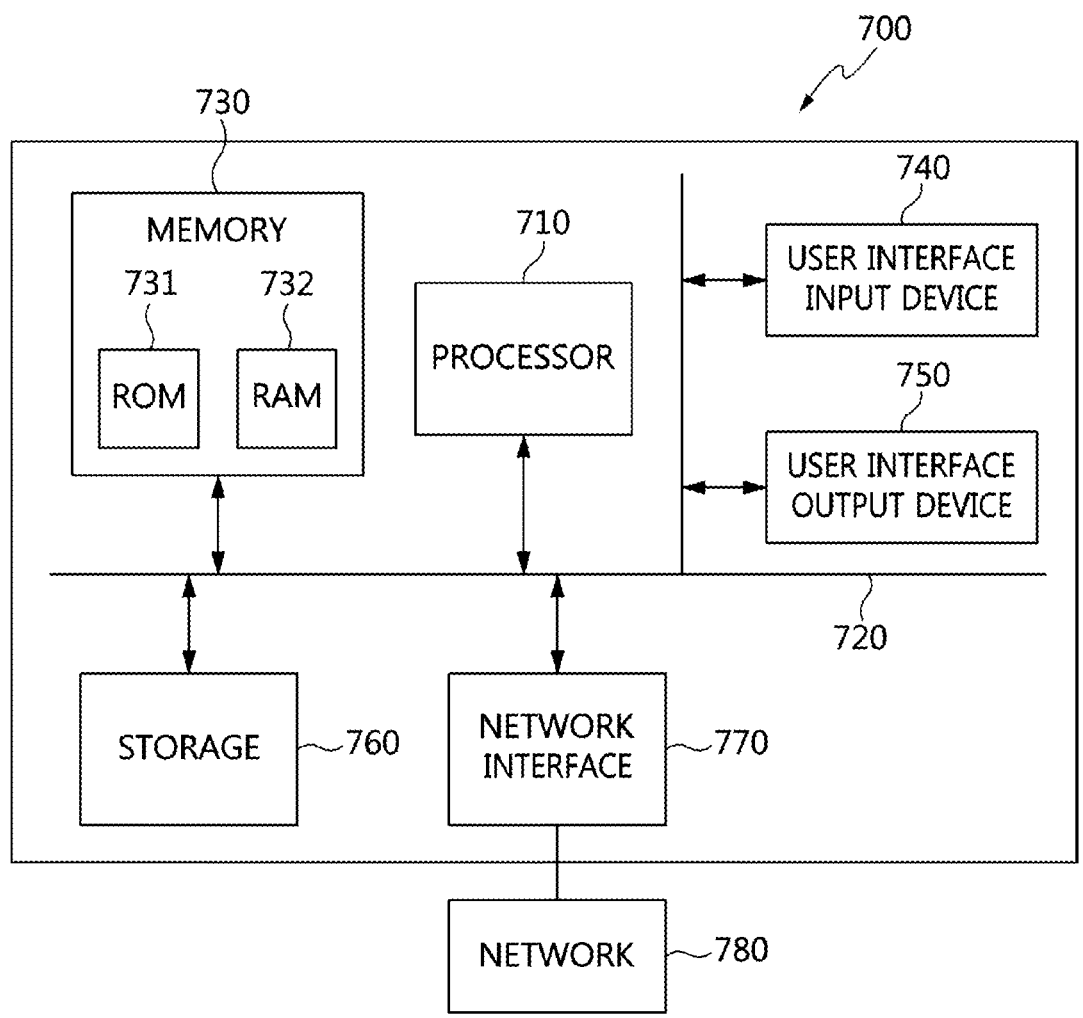
FIG. 7 is a block diagram that shows a computer system according to an embodiment of the present invention.

FIG. 7 is a block diagram that shows a computer system according to an embodiment of the present invention.

Referring to FIG. 7, an embodiment of the present invention may be implemented in a computer system 700 including a computer-readable recording medium. As illustrated in FIG. 7, the computer system 700 may include one or more processors 710, memory 730, a user interface input device 740, a user interface output device 750, and storage 760, which communicate with each other via a bus 720. Also, the computer system 700 may further include a network interface 770 connected to a network 780. The processor 710 may be a central processing unit or a semiconductor device for executing processing instructions stored in the memory 730 or the storage 760. The memory 730 and the storage 760 may be various types of volatile or non-volatile storage media. For example, the memory may include ROM 731 or RAM 732.

Accordingly, an embodiment of the present invention may be implemented as a non-temporary computer-readable storage medium in which methods implemented using a computer or instructions executable in a computer are recorded. When the computer-readable instructions are executed by a processor, the computer-readable instructions may perform a method according to at least one aspect of the present invention.

According to the present invention, a virtual desktop system for supporting high-quality 3D graphics processing may be provided.

Also, according to the present invention, tasks, such as the execution of a 3D CAD program, the playback of high-quality video, and the like, may be performed on a virtual desktop.

As described above, the virtual desktop server for supporting high-quality graphics processing and method for processing high-quality graphics using the virtual desktop server according to the present invention are not limitedly applied to the configurations and operations of the above-described embodiments, but all or some of the embodiments may be selectively combined and configured, so that the embodiments may be modified in various ways.

What is claimed is:

1. A non-transitory computer readable medium having stored thereon a program that, when executed, causes a processor to perform a method of a virtual desktop server for supporting high-quality graphics processing, the method comprising:
creating an instruction for accelerated graphics processing by running a high-quality graphics application;
creating screen data by executing the instruction for accelerated graphics processing and storing the created screen data in a frame buffer;
capturing the screen data stored in the frame buffer;
converting the captured screen data corresponding to a display for rendering into a data format corresponding to a display for transfer;
copying the converted screen data onto the display for transfer; and
transmitting the converted screen data to a client over a network.

2. The non-transitory computer readable medium of claim 1, wherein capture, conversion, and copy of the screen data stored in the frame buffer are repeatedly performed.

3. The non-transitory computer readable medium of claim 1, wherein transmitting the converted screen data to the client is configured to compress the converted screen data and transmit the compressed screen data to the client.

4. The non-transitory computer readable medium of claim 3, wherein transmitting the converted screen data to the client is configured to compress successive screen data using a video compression algorithm.

5. The non-transitory computer readable medium of claim 1, wherein the method further comprises directly allocating a hardware-based graphics accelerator to a virtual desktop during initial setup.

6. The non-transitory computer readable medium of claim 5, wherein allocating the hardware-based graphics accelerator to the virtual desktop is performed using Peripheral Component Interconnect (PCI) passthrough.

7. The non-transitory computer readable medium of claim 5, wherein the method further comprises:
virtualizing hardware resources and providing the virtualized hardware resources to one or more virtual machines.

8. The non-transitory computer readable medium of claim 1, wherein the high-quality graphics application includes at least one of a three dimensional (3D) computer-aided design (CAD) program, a high-quality video playback program, and a graphics acceleration application.

9. A method for processing high-quality graphics, performed by a virtual desktop server, comprising:
creating, by a virtual desktop, an instruction for accelerated graphics processing by running a high-quality graphics application;
storing, by a hardware-based graphics accelerator, screen data, created by executing the instruction for accelerated graphics processing, in a frame buffer;
capturing, by the virtual desktop, the screen data stored in the frame buffer;
converting, by the virtual desktop, the captured screen data corresponding to a display for rendering into a data format corresponding to a display for transfer;
copying, by the virtual desktop, the converted screen data onto the display for transfer; and
transmitting, by a hypervisor, the converted screen data to a client over a network.

10. The method of claim 9, wherein the virtual desktop repeatedly performs capture, conversion, and copy of the screen data stored in the frame buffer.

11. The method of claim 9, wherein transmitting the converted screen data to the client is configured such that the hypervisor compresses the converted screen data and transmits the compressed screen data to the client.

12. The method of claim 11, wherein transmitting the converted screen data to the client is configured to compress successive screen data using a video compression algorithm.

13. The method of claim 9, further comprising:
directly allocating the hardware-based graphics accelerator to the virtual desktop during initial setup.

14. The method of claim 13, wherein directly allocating the hardware-based graphics accelerator is configured to directly allocate the hardware-based graphics accelerator to the virtual desktop using Peripheral Component Interconnect (PCI) passthrough.

15. The method of claim 13, further comprising:
virtualizing a hardware resource including at least one of a central processing unit and main memory; and
providing the virtualized hardware resource to the one or more virtual desktops.

16. The method of claim 9, wherein the high-quality graphics application includes at least one of a three dimensional (3D) computer-aided design (CAD) program, a high-quality video playback program, and a graphics acceleration application.

* * * * *